No. 720,599. PATENTED FEB. 17, 1903.
F. MORITZ.
X-RAY TRACER.
APPLICATION FILED OCT. 13, 1900.
NO MODEL. 2 SHEETS—SHEET 1.

Witnesses:
Ed. Petersen
Florence M. Patrick

Inventor:
Friedrich Moritz,
by Max H. Srugii
Attorney

No. 720,599. PATENTED FEB. 17, 1903.
F. MORITZ.
X-RAY TRACER.
APPLICATION FILED OCT. 13, 1900.
NO MODEL. 2 SHEETS—SHEET 2.
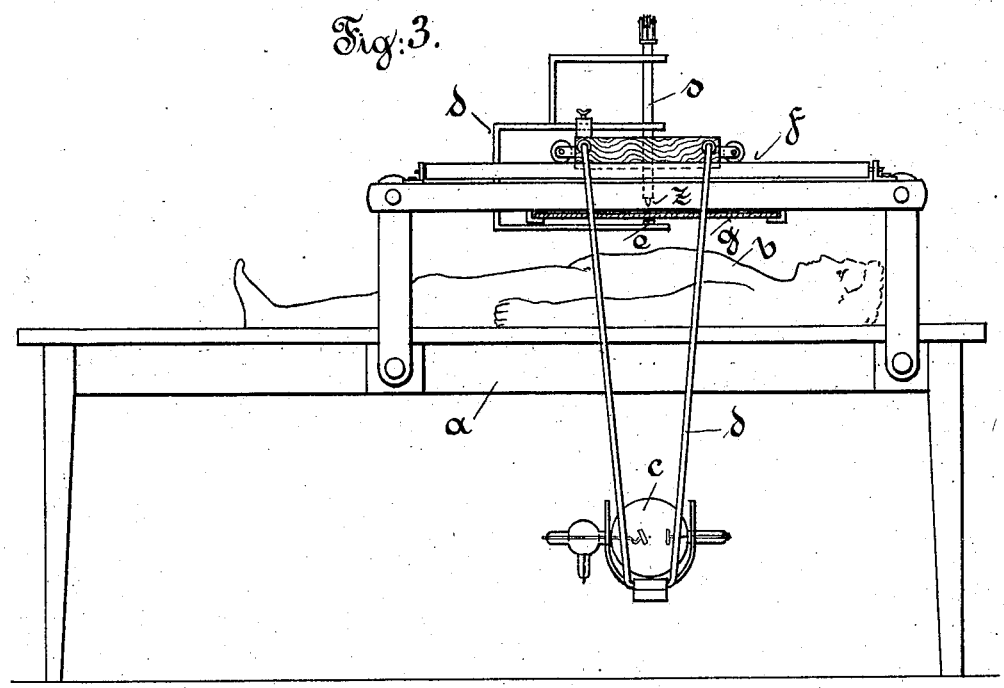
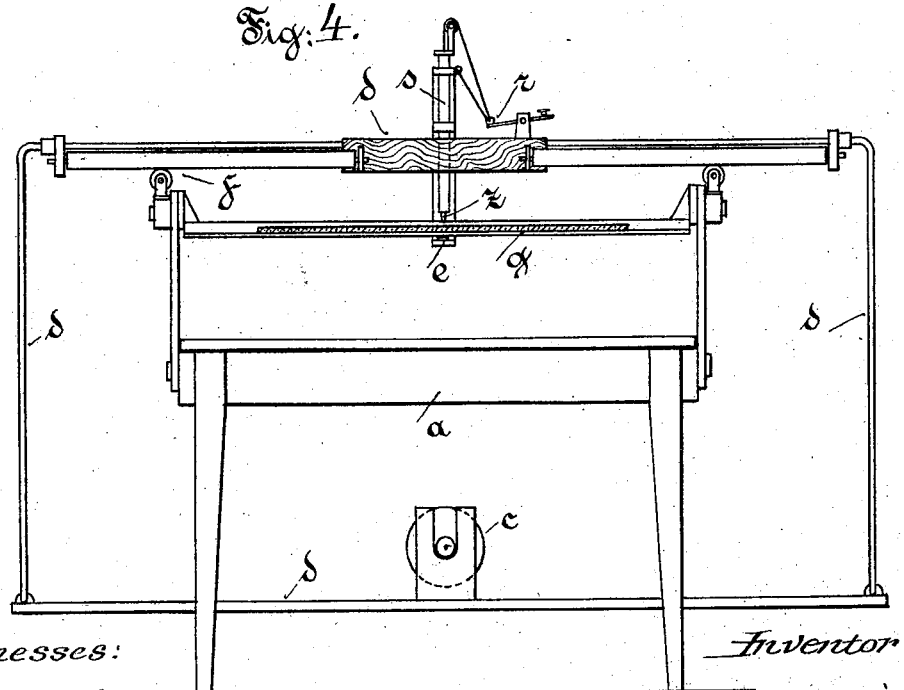

UNITED STATES PATENT OFFICE.

FRIEDRICH MORITZ, OF MUNICH, GERMANY, ASSIGNOR TO VOLTOHM ELECTRICITATS-GESELLSCHAFT, A. G., OF MUNICH, GERMANY, A FIRM.

X-RAY TRACER.

SPECIFICATION forming part of Letters Patent No. 720,599, dated February 17, 1903.

Application filed October 13, 1900. Serial No. 33,002. (No model.)

*To all whom it may concern:*

Be it known that I, FRIEDRICH MORITZ, a subject of the King of Bavaria, residing at Munich, Bavaria, Germany, have invented a useful Process of and Apparatus for X-Ray Tracers, of which the following is a description.

The present invention consists in an apparatus for conveniently ascertaining the exact shape, size, and location of bodies by means of the Roentgen or X rays.

Although it is known that the exact distance apart of two points and consequently the size of a body could be measured with the aid of the Roentgen or X rays, it has hitherto not been possible to ascertain by pictorial representation the true shape and size of a body and its location as regards other bodies without previous measurements. By means of the present process this object is attained in that the exact outline of the body to be determined can be obtained within a few seconds. In order to attain this object, the outline of the shadow of the body in question is drawn on a projection-surface in exactly the same size and shape as the original by the aid of the X-ray of a Roentgen tube arranged perpendicularly to the said surface and movable freely in all directions in a plane parallel to the said surface.

In order to render the present specification easily intelligible, reference is had to the accompanying drawings, in which similar letters of reference denote similar parts throughout both views.

Figure 1:
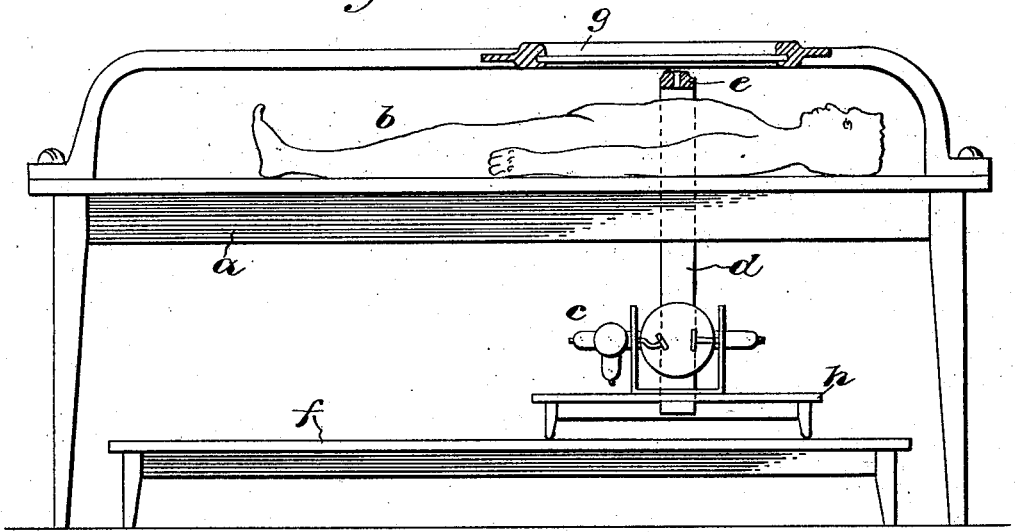
Figure 2:
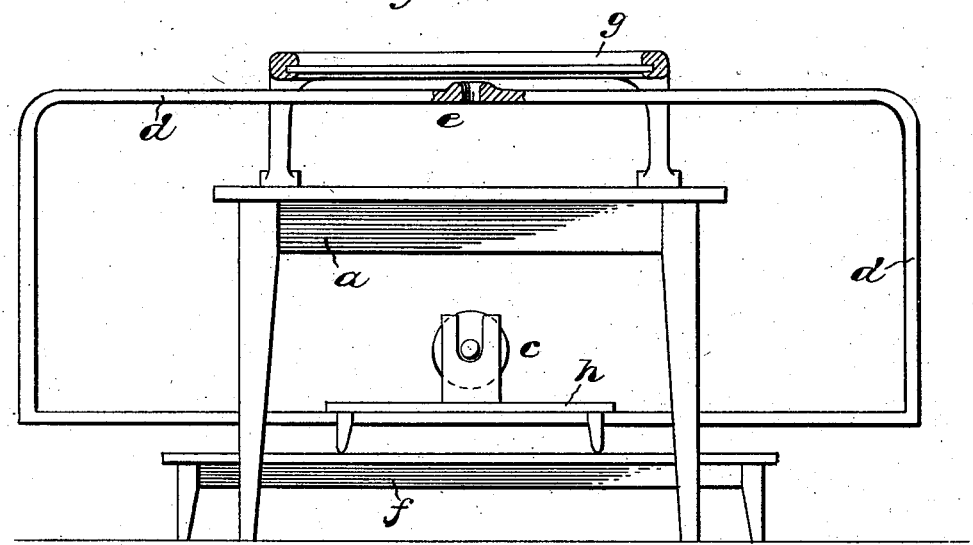

Figure 1 is a view, partly in section, of an apparatus embodying the invention; and Fig. 2 is a view taken at right angles to Fig. 1.

*a* represents a table on which the body *b* to be treated is laid.

*c* is the Roentgen tube; *e*, the marking-spot or position-indicating device; *d*, the movable bow or frame connecting the tube and the marking-spot rigidly and extending around the table, as will be clearly seen from the drawings.

*f* designates a table or other supporting-surface on which the tube is mounted and over which it may be freely moved in any and all directions, being carried by a suitable supporting-frame *h*, to which the bow-frame *d* is attached.

*g* designates a drafting-surface, such as a fluorescent screen, arranged above the marking-point in a plane parallel with the plane of movement of the tube. The marking spot or point is arranged directly over the tube and is connected therewith by means of the bow-frame, so that a movement of one necessarily causes a corresponding similar movement of the other. If the rays from the tube pass perpendicularly across the edge of the body, the edge of the shadow on the screen will coincide with the position of the marking-point, and by moving the tube so that the marking-point will be caused to travel around or along the entire edge of the shadow and moving a pencil with the marking-spot the exact size and shape of the body will be depicted on the screen. If the tube is not perpendicularly below the edge of the body, the rays will pass obliquely across the same, and consequently the edge of the shadow thrown on the screen will be to one side of the marking-point. Now if the marking-spot be moved toward the edge of the shadow it will carry the tube toward the edge of the body, and therefore cause the shadow-producing rays to approach the perpendicular. It will thus be seen that the apparatus permits the making of a visible record of the exact size and shape of the body.

Having thus described my invention, what I claim, and desire to secure by Letters Patent, is—

1. A device for ascertaining the exact shape, size and location of an object, consisting of the combination of a stationary drawing-surface, a surface parallel therewith, a bow or frame supported on the latter surface, an X-ray generator carried by said bow, and a position-indicating device also carried by said frame adjacent to the drafting-surface.

2. The combination with a source of X-rays movable freely in all directions, of a position-indicating device, and means for connecting the position-indicating device to said source whereby a movement of one in any direction causes a movement of the other in the same direction.

3. The combination, with a movable source of X-rays, of a position-indicating device, means for connecting the position-indicating device to said source to permit of their movement in unison, and a drafting-surface mounted in a plane at right angles to that ray from the source which falls on the position-indicating device.

4. The combination, with a movable source of X-rays, of a position-indicating device, a drafting-surface, and means for simultaneously moving the source and the position-indicating device in substantial parallelism to the drafting-surface.

5. The combination, with a drafting-surface located to receive the desired image from the object, of a position-indicating device, a source of X-rays movable in all directions in a plane parallel to the drafting-surface, and means for connecting the position-indicating device to the source of X-rays so that the particular ray which reaches the position-indicating device will be at all times at right angles to the drafting-surface.

6. The combination, with a drafting-surface located to receive the desired image from the object, of a source of X-rays, a position-indicating device located so as to receive from the source that ray which is at right angles to all parts of the plane of the image, said source and position-indicating device being mounted so as to allow a relative movement between the object and themselves, and means for confining this relative movement to substantial parallelism with the drafting-surface.

In witness whereof I have hereunto set my hand in presence of two witnesses.

FRIEDRICH MORITZ.

Witnesses:
   WALLY SEITZ,
   GEORGE T. BURNS.